United States Patent [19]

Tsai

[11] Patent Number: 5,778,488
[45] Date of Patent: Jul. 14, 1998

[54] BAGGAGE CASTER

[76] Inventor: Wang Mei-Li Tsai, No. 103, Ta Min 1 Rd., Tan Tsu Hsian, Taichung Hsien, Taiwan

[21] Appl. No.: 802,797

[22] Filed: Feb. 18, 1997

[51] Int. Cl.⁶ .................................................. B60B 33/06
[52] U.S. Cl. ............................ 16/34; 280/37; 280/47.26; 280/43.17; 280/43.21; 280/43.24
[58] Field of Search ............................ 16/34, 32, 19, 16/44; 280/37, 47.26, 63, 43.14, 43.17, 43.21, 43.24; 190/18 A

[56] References Cited

U.S. PATENT DOCUMENTS

| | | | |
|---|---|---|---|
| 2,774,986 | 12/1956 | Moorehouse | 16/34 |
| 4,026,569 | 5/1977 | Staal | 16/34 |
| 4,773,123 | 9/1988 | Yu | 16/34 |

FOREIGN PATENT DOCUMENTS

| | | | |
|---|---|---|---|
| 1240325 | 7/1960 | France | 16/34 |
| 550044 | 10/1956 | Italy | 16/34 |

*Primary Examiner*—Chuck Mah
*Attorney, Agent, or Firm*—Browdy and Neimark

[57] ABSTRACT

A baggage caster is composed of a wheel frame, a wheel, and a retrieving mechanism. The wheel frame is fastened pivotally with a baggage shell such that the wheel frame is capable of swiveling between a retraction position and an extraction position. The wheel is fastened pivotally with the wheel frame such that a plummet of the pivot center of the wheel does not coincide with a plummet of the pivot center of the wheel frame at such time when the wheel frame is located at the retraction position. The wheel frame is therefore capable of swiveling to remain at the extraction position when the baggage shell is exerted on by a load. The retrieving mechanism is intended to provide the wheel frame with an elastic force to enable the wheel frame to return to the retraction position when the baggage shell is relieved of the load exerting thereon.

8 Claims, 8 Drawing Sheets

1

BAGGAGE CASTER

FIELD OF THE INVENTION

The present invention relates generally to a caster, and more particularly to a baggage caster.

BACKGROUND OF THE INVENTION

The baggages are generally provided with a plurality of casters to facilitate the moving of the baggages on the floor. The casters are fastened pivotally with the baggage shells in various ways. For example, the baggage shell is provided at the front bottom corner thereof with two casters while the baggage shell is provided at the rear bottom corner thereof with two extensions which are provided respectively with a caster fastened pivotally therewith such that the bottom underside of the baggage shell and the floor form an angle so as to facilitate the moving of the baggage with a hand holding the handle of the baggage. Such a prior art baggage caster as described above is defective in design in that it takes up a large floor space, and that it is therefore not cost-effective in terms of storage and shipment.

SUMMARY OF THE INVENTION

The primary objective of the present invention is to provide a baggage caster which is capable of causing the baggage body to remain in an inclined position at such time when the baggage body is moved on the floor, and which is capable of causing the baggage body to remain in an upright position to save floor space at such time when the baggage caster is not at work.

In keeping with the principle of the present invention, the foregoing objective of the present invention is attained by an improved baggage caster, which is composed of a wheel frame, a small wheel, and a frame-retrieving mechanism. The wheel frame is fastened pivotally with the bottom corner of a baggage shell such that the frame is capable of swiveling. The small wheel is fastened pivotally with the wheel frame such that the plummet of the center of the wheel pivot does not coincide with the plummet of the center of the frame pivot at such time when the frame is retracted, and that the wheel frame is capable of extracting when the baggage is loaded. The retrieving mechanism enables the wheel frame to retract when the baggage is relieved of the load.

DETAILED DESCRIPTION OF THE INVENTION

Figure 1:
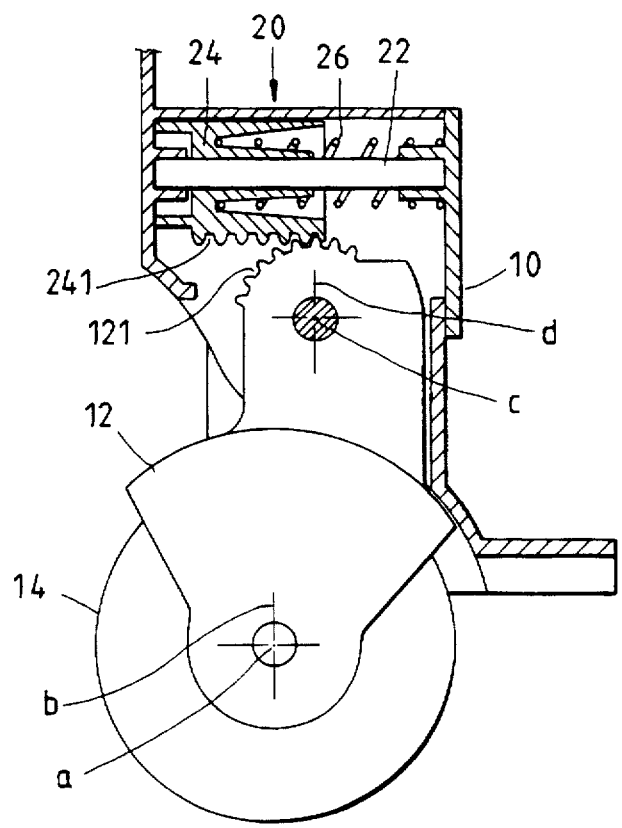
FIG. 1 is a schematic view showing that the wheel frame of a first preferred embodiment of the present invention is retracted.
Figure 2:
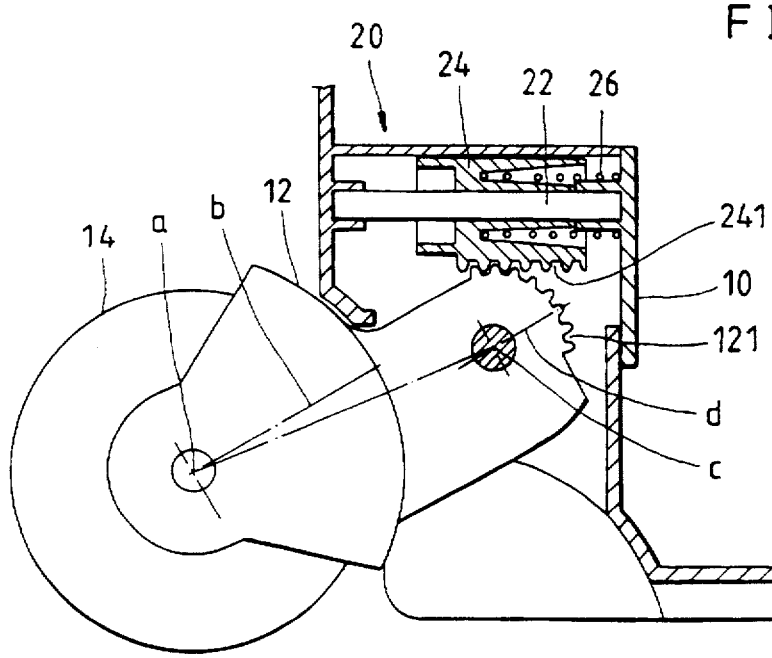
FIG. 2 is a schematic view illustrating that the wheel frame of the first preferred embodiment of the present invention is extracted.

As shown in FIGS. 1 and 2, a baggage caster of the first preferred embodiment of the present invention is fastened pivotally with a baggage shell 10 and is composed of a wheel frame 12, a small wheel 14, and a retrieving mechanism 20.

The wheel frame 12 is fastened pivotally with the baggage shell 10 such that the wheel frame 12 is capable of swiveling between a retraction position, as shown in FIG. 1, and an extraction position, as shown in FIG. 2.

The small wheel 14 is fastened pivotally with the wheel frame 12 such that the plummet b of the pivot center a of the small wheel 14 does not coincide with the plummet d of the pivot center c of the wheel frame 12 at such time when the wheel frame 12 is retracted. As a result, the wheel frame 12 is capable of swiveling to remain in the extraction position when the baggage is loaded.

The retrieving mechanism 20 is fastened with the baggage shell 10 to provide the wheel frame 12 with a force to facilitate the retrieval of the wheel frame 12 which is extracted. The retrieval of the wheel frame 12 takes place as soon as the baggage is relieved of the load.

The retrieving mechanism 20 of the first preferred embodiment of the present invention comprises a guide rod 22, a connection member 24, and a resilient element 26.

The guide rod 22 is fastened with the baggage shell 10.

The connection member 24 is fastened movably with the guide rod 22 such that the connection member 24 is capable of displacing along the direction of the longitudinal axis of the guide rod 22. The connection member 24 has a toothed side 241 engageable with an arcuate toothed side 121 of the wheel frame 12. As a result, the connection member 24 can be driven to displace by the wheel frame 12 in motion.

The resilient element 26 is a coil spring, which is fitted over the guide rod 22 such that one end of the coil spring 26 urges the baggage shell 10, and that another end of the coil spring 26 urges the connection member 24. As the wheel frame 12 is extracted, the connection member 24 is driven to displace so as to compress the coil spring 26. When the baggage is relieved of the load, the connection member 24 is forced by the compressed coil spring 26 to return to its original position. In the meantime, the wheel frame 12 is also forced to swing back to its retraction position, as shown in FIG. 1.

As the caster of the present invention is exerted on by a load of a threshold quantity, the caster of the present invention is capable of swiveling from its retraction position to its extraction position, thereby causing the baggage shell 10 to remain in an inclined position to enable the baggage to be moved easily on the floor. The threshold quantity of the load is dependent on the distance between the two plummets b and d, as well as the magnitude of the resilient force of the coil spring 26.

The retrieval speed of the wheel frame 12 can be accelerated by means of a nonlinear spring.

Figure 3:
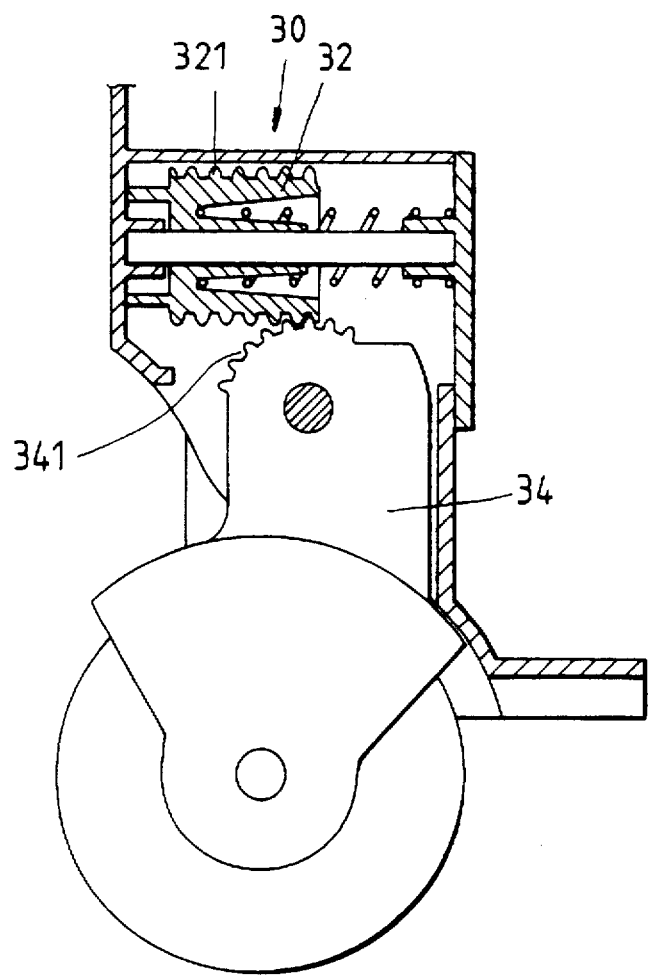
FIG. 3 shows a schematic view of a second preferred embodiment of the present invention.

Now referring to FIG. 3, a retrieving mechanism 30 of the second preferred embodiment of the present invention comprises a connection member 32, which is provided with a spiral toothed side 321 engageable with an arcuate toothed side 341 of a wheel frame 34. As a result, the connection member 32 can be driven to displace by the wheel frame 34 in motion. In other words, the swiveling speed of the wheel frame 34 is moderated.

Figure 4:
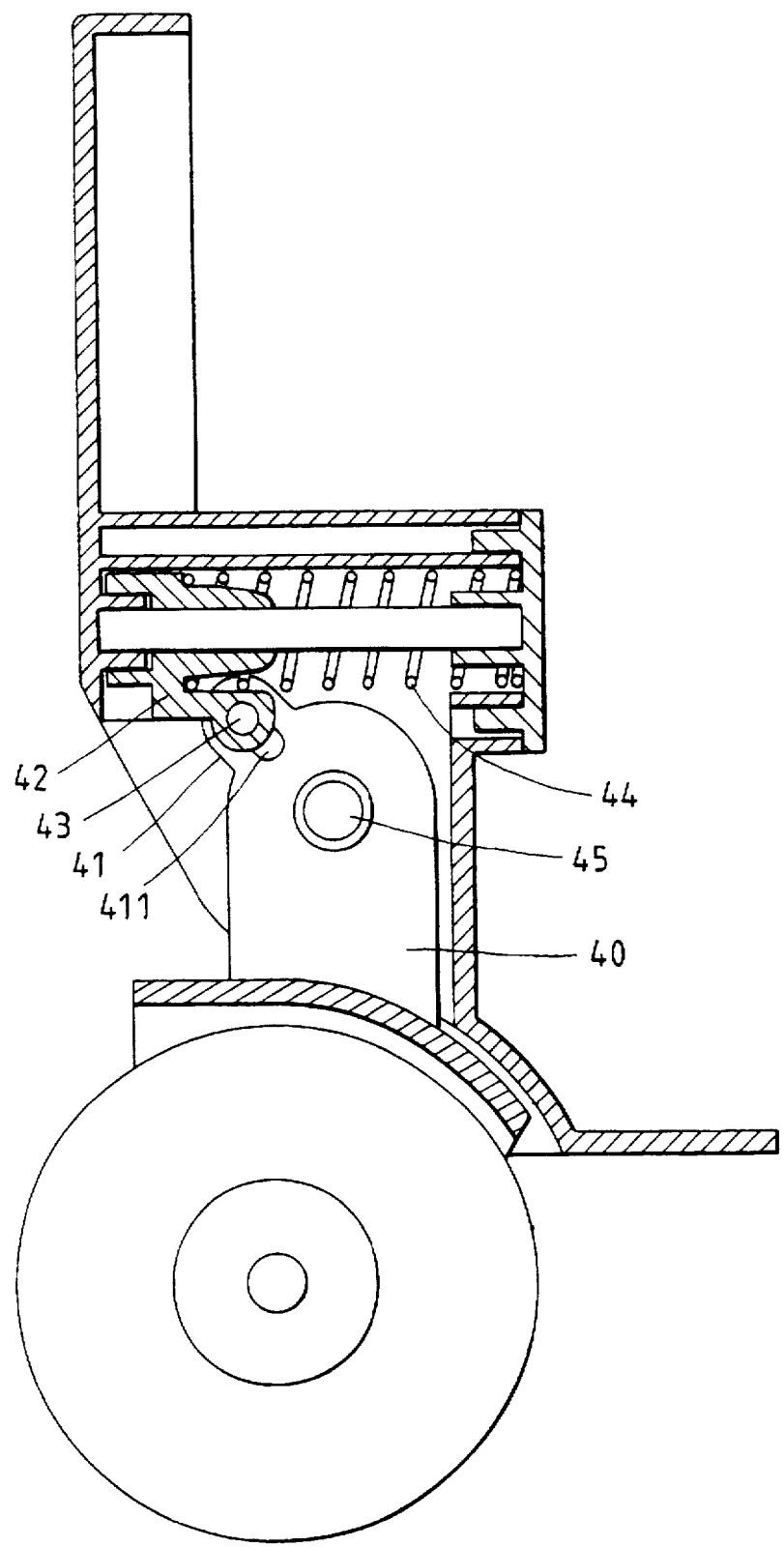
FIG. 4 is a schematic view showing that the wheel frame of a third preferred embodiment of the present invention is retracted.
Figure 5:
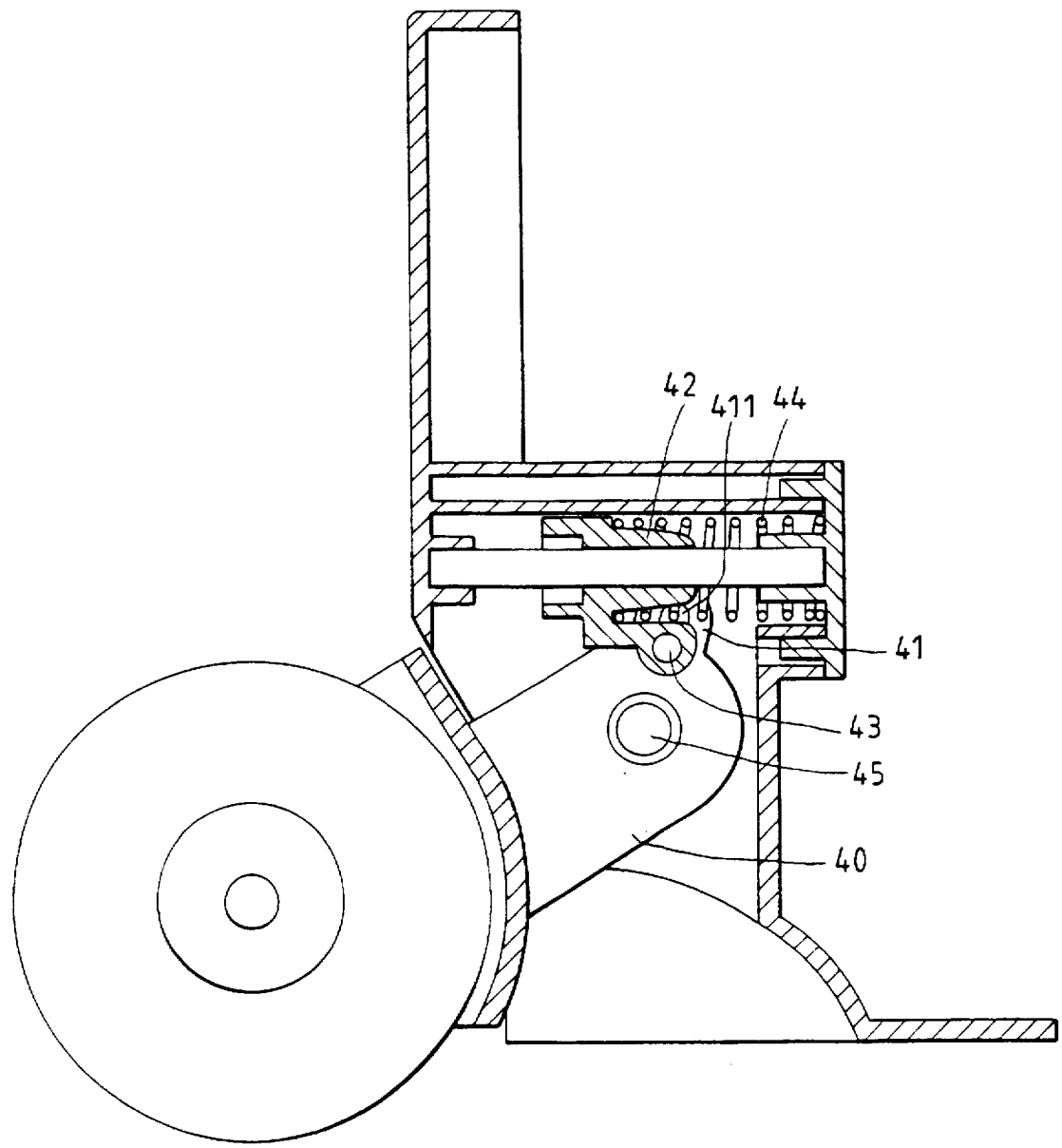
FIG. 5 is a schematic view showing that the wheel frame of the third preferred embodiment of the present invention is extracted.

As illustrated in FIGS. 4 and 5, a wheel frame 40 of the third preferred embodiment of the present invention is provided with a lug 41 having an elongated hole 411 for receiving therein a pin 43, by means of which the connection member 42 is connected with the wheel frame 40. As the wheel frame 40 is caused to swivel outwards to actuate the connection member 42 to compress a spring 44, the wheel frame 40 is capable of being forced back to its original position by the elastic force of the compressed spring 44.

Figure 6:
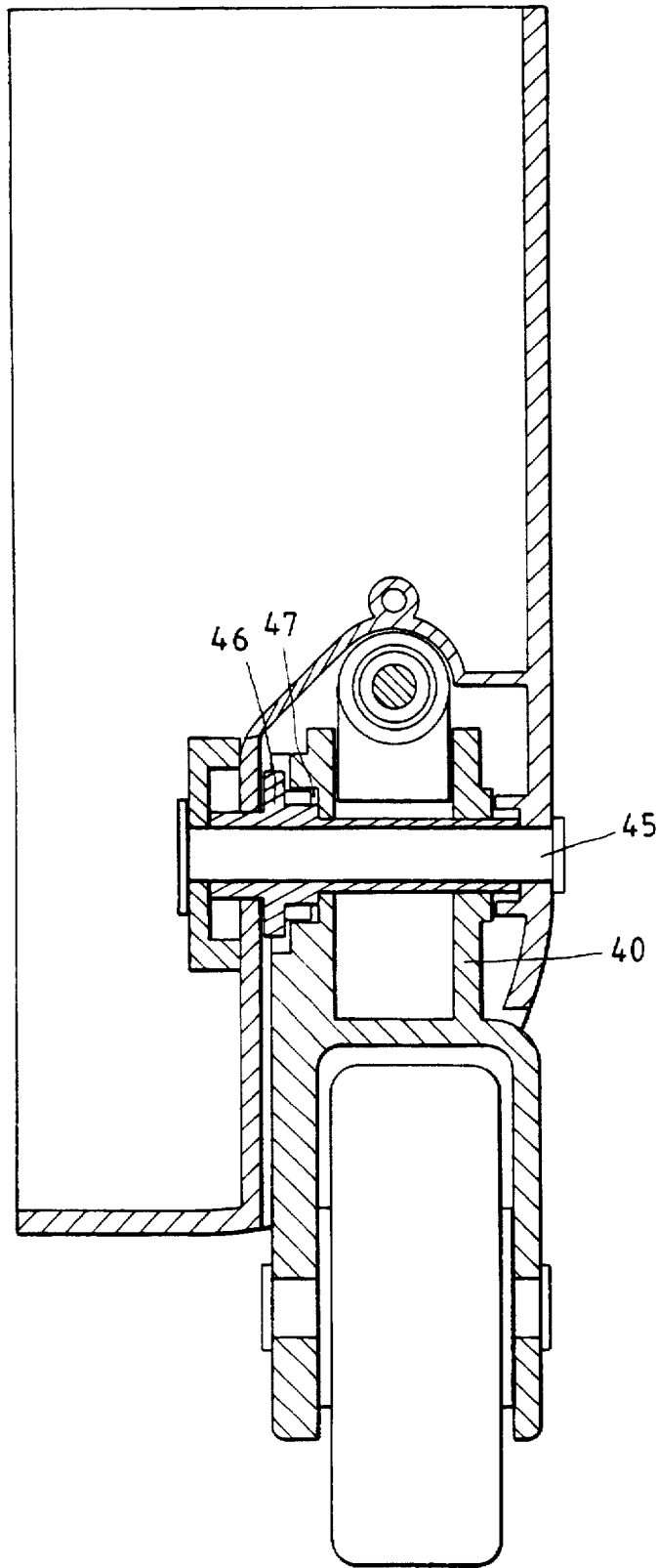
FIG. 6 shows a sectional view of a portion taken along the direction indicated by a line 6—6 as shown in FIG. 4.

As illustrated in FIG. 6, the wheel frame 40 and a gear 46 are mounted coaxially on a shaft 45 such that the gear 46 is engaged with a toothed side 47 of the wheel frame 40, thereby resulting in the moderation of the swiveling speed of the wheel frame 40. This feature is applicable to the first preferred embodiment of the present invention.

Figure 7:
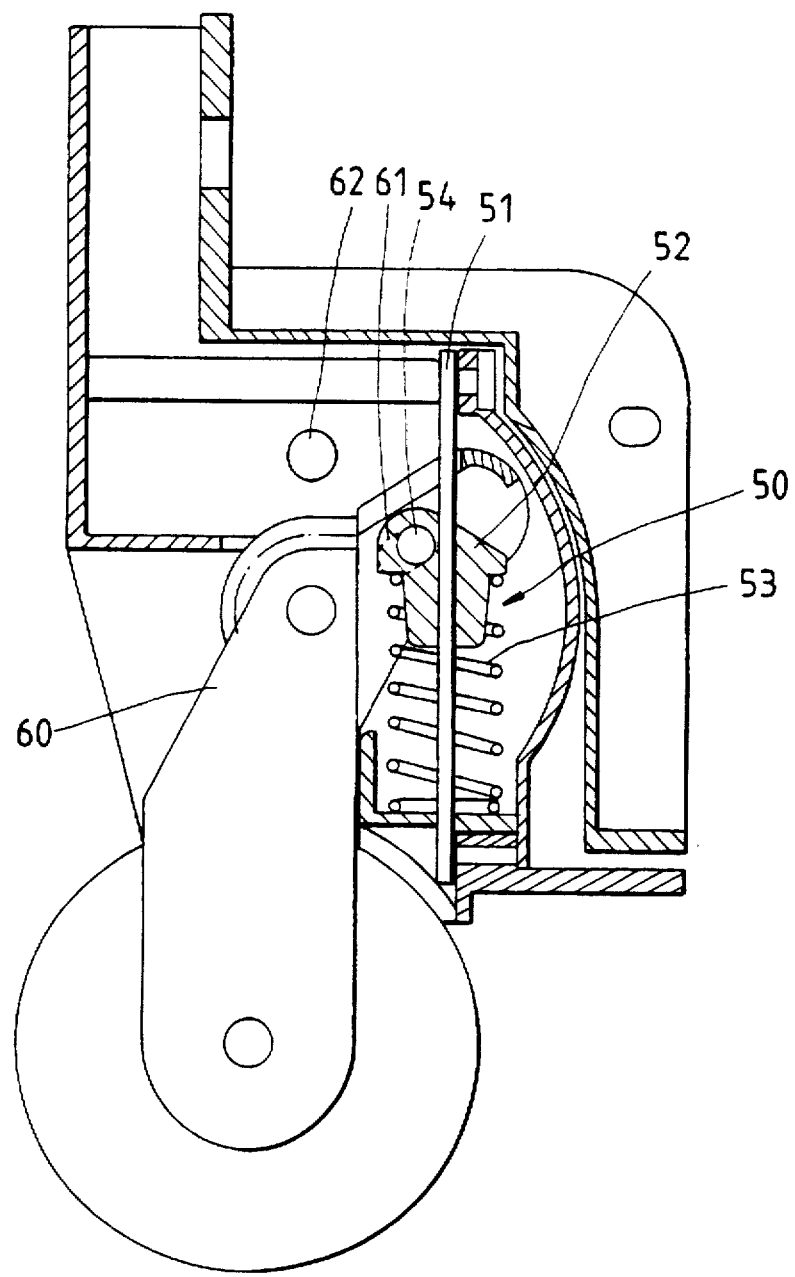
FIG. 7 is a schematic view showing that the wheel frame of a fourth preferred embodiment of the present invention is retracted.
Figure 8:
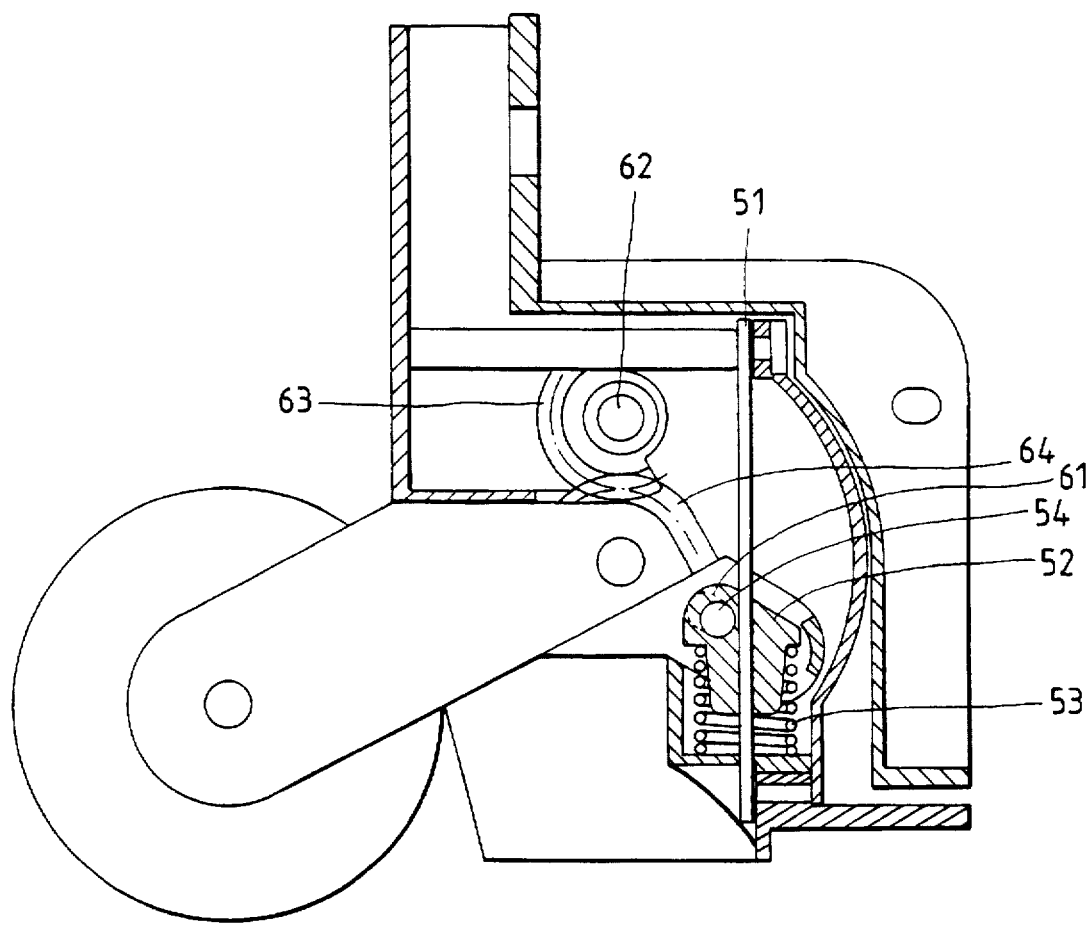
FIG. 8 is a schematic view showing that the wheel frame of the fourth preferred embodiment of the present invention is extracted.
Figure 9:
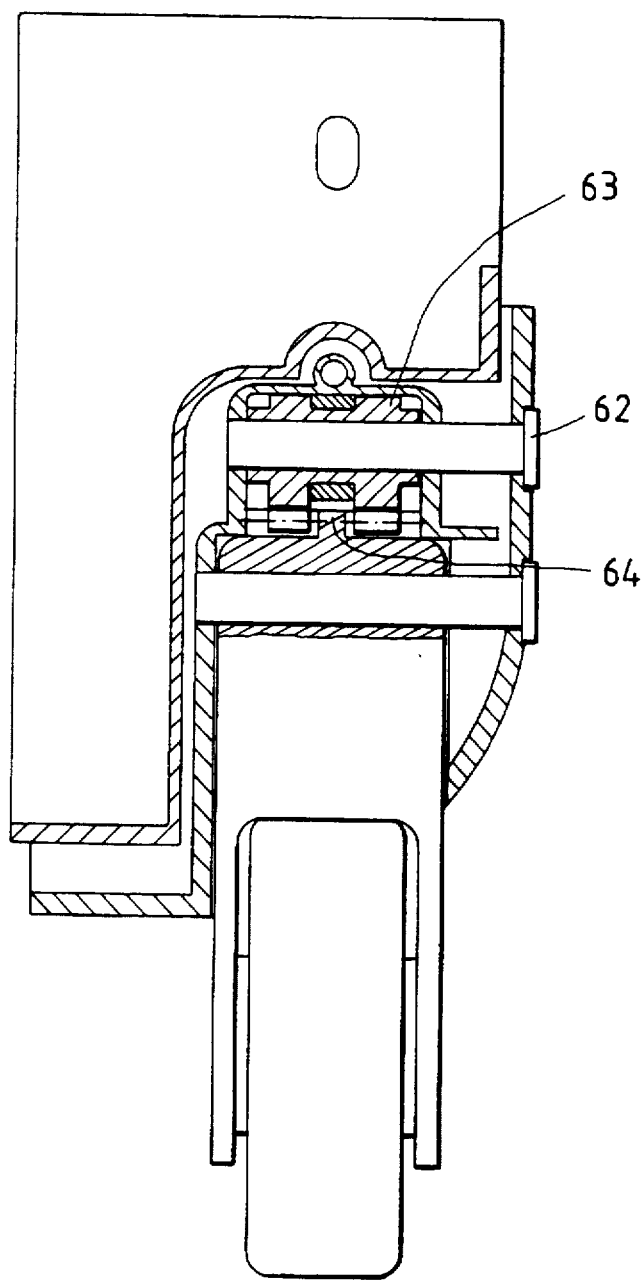
FIG. 9 shows a sectional view taken along the direction indicated by a line 9—9 as shown in FIG. 7.

Referring to FIGS. 7–9, a retrieving mechanism 50 of the fourth preferred embodiment of the present invention comprises a guide rod 51, a connection member 52, and a resilient member 53. The connection member 52 is connected with a wheel frame 60 by means of a pin 54 which is received in an elongated hole 60 of the wheel frame 60. In addition, a gear 63 is mounted on a shaft 62 such that the gear 63 is engaged with a toothed side 64 of the wheel frame 60 for moderating the swiveling motion of the wheel frame 60.

What is claimed is:

1. A baggage caster comprising:
    a wheel frame fastened pivotally with a baggage shell such that said wheel frame is capable of swiveling freely between a retraction position and an extraction position;
    a wheel fastened pivotally with said wheel frame such that a plummet of a pivot center of said wheel does not coincide with a plummet of a pivot center of said wheel frame at such time when said wheel frame is located at the retraction position, and that said wheel frame is caused to swivel to remain at the extraction position at such time when the baggage shell is exerted on by a load; and
    a retrieving mechanism fastened with the baggage shell such that said retrieving mechanism is contiguous to said wheel frame for providing said wheel frame with an elastic force capable of forcing said wheel frame back to the retraction position from the extraction position at such time when the baggage shell is relieved of the load exerting thereon.

2. The baggage caster as defined in claim 1, wherein said retrieving mechanism comprises:
    a linking member fastened with the baggage shell such that said linking member is driven to displace by said wheel frame in motion; and
    a resilient member capable of being deformed by said linking member in motion so as to provide said linking member with an elastic force capable of forcing said linking member to return to an original position, thereby resulting in a retrieval of said wheel frame to the retraction position from the extraction position at such time when the baggage shell is relieved of the load exerting on the baggage shell.

3. The baggage caster as defined in claim 2, wherein said linking member is fitted over a guide rod such that said linking member is capable of moving in the direction of a longitudinal axis of said guide rod; and wherein said resilient member is a coil spring fitted over said guide rod such that one end of said coil spring urges the baggage shell, and that another end of said coil spring urges said linking member.

4. The baggage caster as defined in claim 2, wherein said linking member is provided with a toothed portion; and wherein said wheel frame is provided with an arcuate toothed portion engageable with said toothed portion of said linking member.

5. The baggage caster as defined in claim 2, wherein said linking member is provided with a spiral toothed portion; and wherein said wheel frame is provided with an arcuate toothed portion engageable with said spiral toothed portion of said linking member.

6. The baggage caster as defined in claim 2, wherein said wheel frame is provided with a hole for receiving therein a pin for connecting said linking member with said wheel frame.

7. The baggage caster as defined in claim 6, wherein said wheel frame is provided with a gear mounted coaxially with said wheel frame such that said gear is engaged with said arcuate toothed portion of said wheel frame.

8. The baggage caster as defined in claim 6, wherein said wheel frame is provided with a gear mounted on a shaft such that said gear is engaged with said arcuate toothed portion of said wheel frame.

* * * * *